Patented Aug. 16, 1932

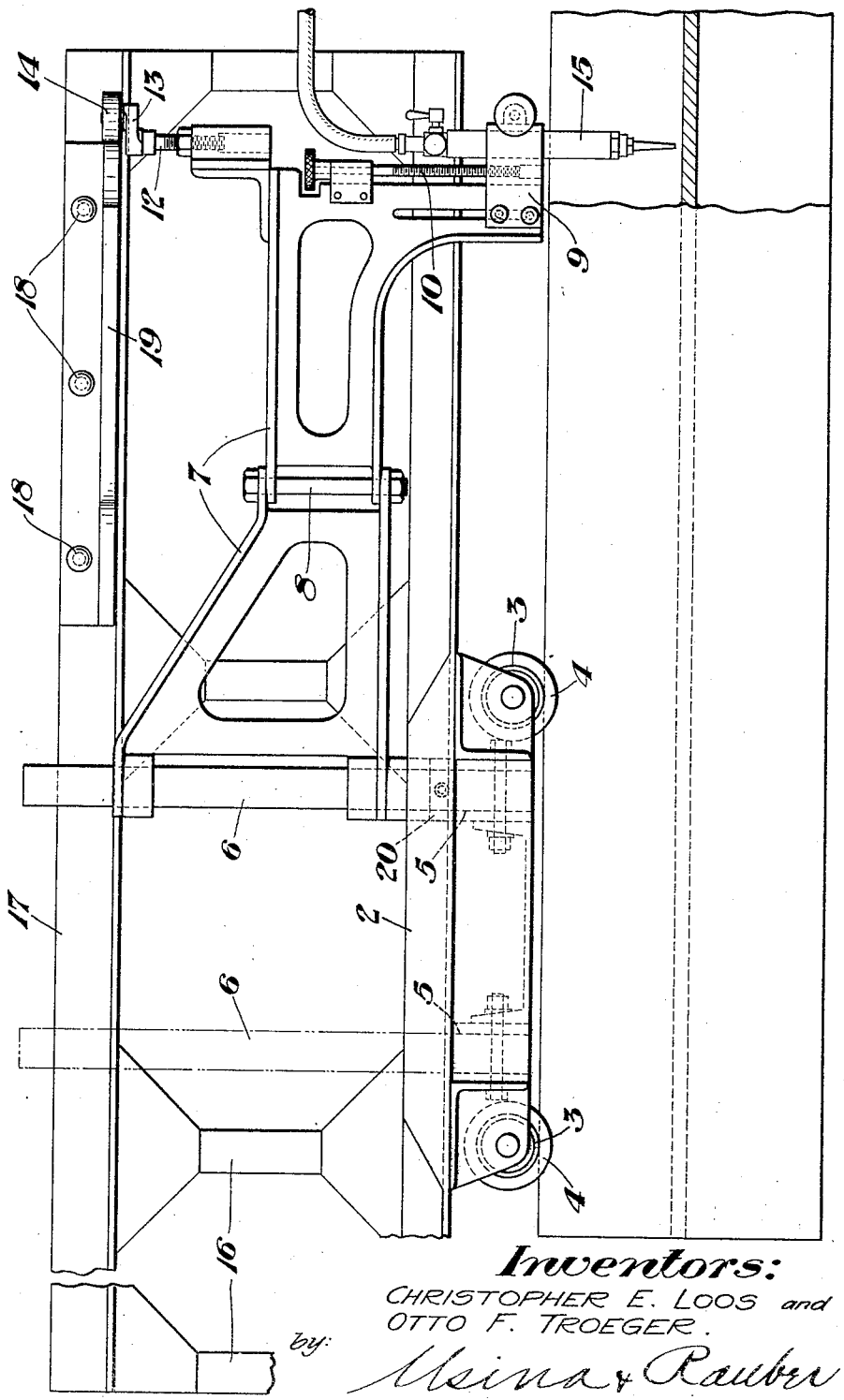

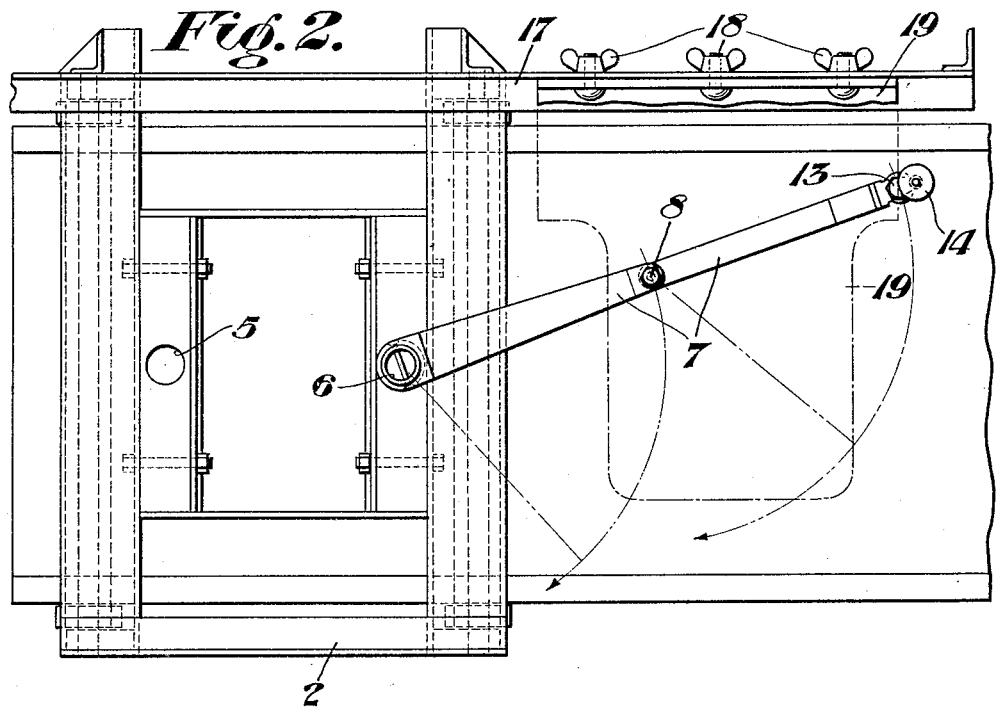
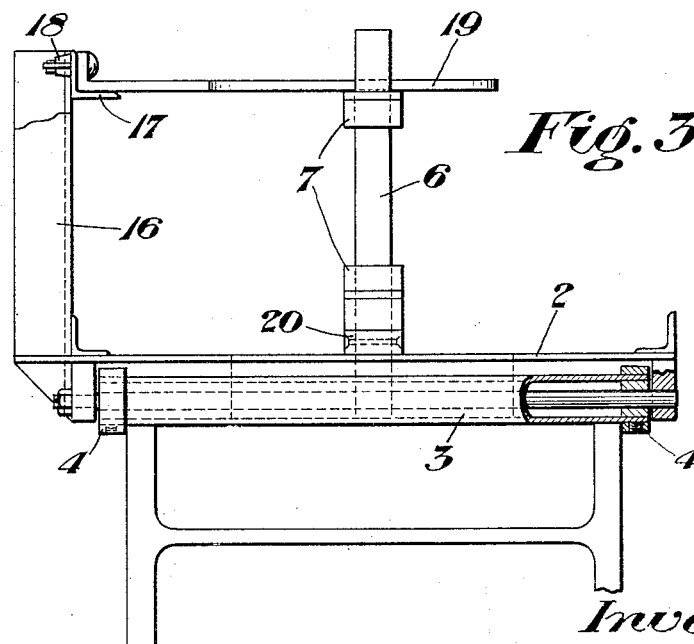

1,872,086

UNITED STATES PATENT OFFICE

CHRISTOPHER E. LOOS, OF BEN AVON, AND OTTO F. TROEGER, OF FAIROAKS, PENNSYLVANIA

STRUCTURAL STEEL CUTTING MACHINE

Application filed September 9, 1931. Serial No. 561,910.

This invention relates to structural steel cutting machines, one of the objects being to provide an improved, simplified and light weight machine of this character. Other objects may later become apparent.

In the drawings:

Figure 1 is a side view of one example of a machine constructed in accordance with this invention.

Figure 2 is a top plan view of the machine shown in Figure 1.

Figure 3 is an end view looking toward the right of Figure 1.

Having reference to these drawings, there is shown a chassis consisting of a frame 2 carried by a pair of cylindrical rollers 3 having longitudinally adjustable flanges 4 near each of their ends. This frame 2 is constructed with sockets 5 near its ends, these sockets interchangeably receiving an upstanding tubular support 6 which vertically adjustably carries an arm 7 for the swinging movement thereon, this arm being jointed on a bolt 8 so as to be flexible in a horizontal plane. A torch holder 9 is vertically slidably carried on the free end of this arm and is in engagement with a threaded bolt 10 rotatably fixed in position thereon. A short rod 12 is in screw threaded engagement with the top of the arm 7 at its free end and pivotally carries a finger 13, to the free end of which a roller 14 is rotatably fixed.

The rod 12 is positioned so that when a torch 15 is clamped in the holder 9 the axis of this rod and torch will be alined, and the finger 13 is constructed so that the circumferential surface of the roller 14 will be tangent to the axis of these two just named parts. A superstructure 16 is erected on one side of the frame 2 and has a top bar 17 extending out from the ends thereof to a length substantially equal to that of the arm 7, and is positioned so as to ride substantially in a plane with the roller 14. Each end of this top bar 17 carries clamping bolts 18 adapted to position a template 19 in a plane with this top bar and the roller 14.

In the illustration a structural steel H-section is to be cut by the machine just described. The machine is laid on the top edges of this section so that it may be moved back and forth thereover on its rollers 3, the flanges 4 having been adjusted to prevent sidewise movement. The torch 15 has been vertically adjusted, through the medium of the bolt 10, for cutting the web of this section. The template 19 is positioned by the clamping bolts 18 so that the roller 14 contacts its edges, this template having been cut to conform to the shape of the cut which is to be made in the steel section.

The arm 7 is now guided so that the roller 14 always contacts the template 19, it following that the torch 15 cuts the steel web section in conformity with the shape of this template. Because of the two sockets 5 in the frame 3 it is possible to position the arms 7 to extend from either end of the machine, this being a decided advantage over machines having arms which extend from one end only. If desired, a second bar 6 may be permanently positioned in the socket 5 and the arm 7 slid off of one support and onto another when desired. Preferably, a sleeve 20 is positioned on the bar 6 beneath the supporting part of the arm 7, this sleeve being substituted by another of greater or lesser length when the bolt 10 is of insufficient range because there is too great a vertical adjustment necessary.

Although a specific form of this invention has been shown in accordance with the patent statutes, it is not intended to limit the scope of this invention exactly thereto, except as is defined in the appended claims.

We claim:

1. A structural steel cutting machine comprising a frame, rollers carrying said frame, longitudinally adjustable flanges on said rollers, a support on said frame and a torch holding arm carried by said support.

2. A structural steel machine comprising a chassis for traveling over the steel to be cut, a support on said chassis, an arm jointed for flexibility in a horizontal plane and arranged for vertical adjustment on said support, a vertically adjustable torch holder on the end of said arm, a roller pivotally carried on the end of said arm above said holder so that its circumferential surface is tangent to the axis of a torch when in this holder and a template supporting superstructure on said chassis extending the length of said arm with its top substantially alined with said roller carried thereon.

3. A structural steel cutting machine comprising a frame, cylindrical rollers extending the width of said frame and rotatably fixed to the underside thereof, flanges longitudinally adjustably fixed about said rollers, an upstanding support on said frame and a torch holding arm carried by said support.

4. A structural steel cutting machine comprising a frame, cylindrical rollers extending the width of said frame and rotatably fixed to the underside thereof, flanges longitudinally adjustably fixed about said rollers, an upstanding support attachable to either end of said frame, an arm jointed for flexibility in a horizontal plane and arranged for vertical adjustment on said support, a torch holder in vertical screw threaded engagement with the end of said arm, a roller pivotally carried on the end of said arm above said holder so that its circumferential surface is tangent to the axis of a torch when in this holder, a superstructure on said frame with its top extending out from each end thereof substantially in a plane with the roller on said arm and means on the top of said superstructure for supporting a template in a plane therewith.

In testimony whereof, we have hereunto set our hands.

CHRISTOPHER E. LOOS
OTTO F. TROEGER.